United States Patent

[11] 3,573,350

[72] Inventor Dong W. Rhee
Williamsville, N.Y.

[21] Appl. No. 671,336
[22] Filed Sept. 28, 1967
[45] Patented Apr. 6, 1971

[73] Assignee Sylvania Electric Products, Inc.
Seneca Falls, N.Y.

[54] COLOR TELEVISION RECEIVER AND COLOR VIDEO TAPE RECORDER SYSTEM
6 Claims, 4 Drawing Figs.

[52] U.S. Cl. .......... 178/5.2, 178/5.4, 178/6.6
[51] Int. Cl. .......... H04n 9/02, H04n 9/38, H04n 5/78
[50] Field of Search .......... 178/5.4 (CR), 5.4(12), 6.6 (A), 5.2; 179/100.2

[56] References Cited

UNITED STATES PATENTS

| | | | |
|---|---|---|---|
| RE26,412 | 6/1968 | Dolby et al. | 178/6.6X |
| 3,008,001 | 11/1961 | Reita | 178/6X |
| 3,320,370 | 5/1967 | Barry | 178/6.6X |

*Primary Examiner*—Richard Murray
*Assistant Examiner*—Richard K. Eckert, Jr.
*Attorneys*—Robert E. Strausser, Norman J. O'Malley and Cyril A. Krenzer

ABSTRACT: An adapter is connected between a color television receiver and a color video tape recorder. During the record operation, the signal taken from the video detector of the television receiver is fed to the adapter network which provides impedance matching between the receiver and the recorder, and the composite video signal is recorder in the color video tape recorder. The video tape recorder includes an RF oscillator such that during the playback cycle the video tape recorder output is the RF signal modulated by the recorded composite video signal. The output of the video tape recorder also includes a 3.58 mc. subcarrier signal synchronized with the color burst from the composite video signal, which is fed through the adapter to the color demodulator input of the television receiver. The subcarrier signal from the video tape recorder is used only to provide demodulation of the color signal in the television receiver. The video tape recorder subcarrier signal is generated in a manner which compensates for variations in speed of the video tape recorder.

INVENTOR.
DONG W. RHEE

BY Robert E. Steiner
ATTORNEY

INVENTOR.
DONG W. RHEE
BY
Robert E. Strausser
ATTORNEY

COLOR TELEVISION RECEIVER AND COLOR VIDEO TAPE RECORDER SYSTEM

BACKGROUND OF THE INVENTION

Monochrome video tape recorders have found extensive use in industrial and commercial applications, and recently have become practical for use in the home. However, difficulties have been encountered in trying to provide moderate cost color video tape recorders for use in conjunction with conventional color television receivers, primarily because of the more stringent requirements of the color broadcast signal. The color broadcast signal includes a 3.58 mc. color burst signal which is utilized to synchronize a local oscillator in the receiver that generates a continuous wave subcarrier signal for demodulation of the color signal components of the composite video signal. The subcarrier oscillator in the television receiver has a relatively narrow pull-in range since the subcarrier burst signal is closely controlled at the transmitter and does not deviate appreciably from the central frequency of the subcarrier oscillator. This, of course, permits the use of a simplified, more economical subcarrier oscillator.

The difficulty encountered with the video tape recorder is that the tape speed may vary substantially with respect to the tolerances imposed by the narrow pull-in range of the subcarrier oscillator in the color television receiver with the result that color synchronization is lost and displayed image does not meet the minimum acceptable standards. One solution to the problem would be to improve the speed control of the video tape recorder so that the burst signal output therefrom will be within the limits of the subcarrier oscillator in the television receiver. However, when considering this possibility it must be recognized that with a crystal-controlled oscillator as is commonly used, the pull-in range is only a few hundred cycles or about 0.02 percent, which means that the speed of the video tape recorder would have to be held within the same tolerance. This, of course, is not an economic practicality. An alternate solution is to modify the subcarrier oscillator of the television receiver to provide a much greater pull-in range to compensate for the varying speed of the video tape recorder. However, in an era of mass production such a modification would generally be effected on all television receivers regardless of whether or not they are eventually to be mated with a video tape recorder. This, while possible, is undesirable because of the adverse economies which would result in an increased cost for each receiver.

OBJECTS AND SUMMARY OF THE INVENTION

Accordingly, it is an object of this invention to provide a television receiver and a video tape recorder system which permits faithful reproduction of color signals.

Another object of this invention is to provide a television receiver and a video tape recorder system which automatically distinguishes between color and monochrome signals recorded on the video tape recorder.

Still another object of this invention is to provide a television receiver and a video tape recorder system which is economical in design and relatively noncomplicated in use.

A further object of this invention is to provide an adapter for a television receiver and a video tape recorder that does not significantly affect the economies of design of the television receiver or the video tape recorder.

According to one aspect of the invention, a composite video signal output from the video detector of the television receiver is applied to the video input of the video tape recorder and recorded. The recorder has two outputs, one being an internally generated RF signal modulated by the recorded composite video signal which is applied to the tuner of the television receiver, and a second output being a 3.58 mc. subcarrier continuous wave signal which is applied to the color demodulator and amplifier circuitry of the television receiver to permit demodulation of the color signal components of the composite video signal.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
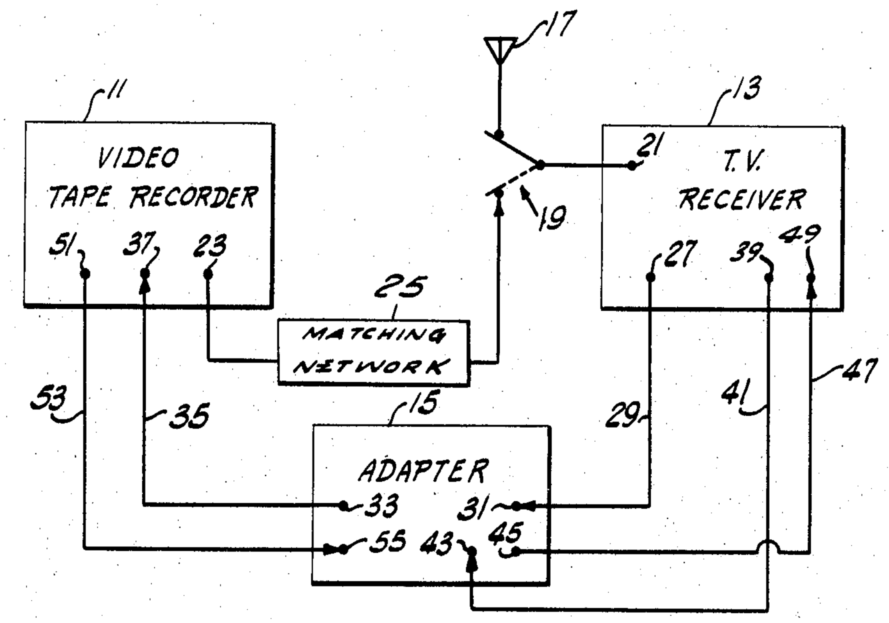
FIG. 1 is a block diagram of a television receiver, adapter and video tape recorder according to the present invention.

Referring now to the block diagram of FIG. 1, there is shown a video tape recorder 11, a television receiver 13 and an adapter network 15 connected between the video tape recorder and the television receiver. An antenna 17 is connected to a two-position switch 19 such that when the switch is in the upward position as illustrated by the straight line, the antenna is connected directly to the tuner input 21 of the receiver. When the switch 19 is in the downward position as indicated by the dotted line, the modulated output 23 of the video tape recorder is connected via a matching network 25 to the tuner input 21 of the receiver. The video detector output 27 of the receiver is connected via line 29 to an input terminal 31 of the adapter network 15. The adapter network, in a manner to be later described, provides impedance matching between the receiver and the recorder, and the video output from the terminal 33 is connected via line 35 to the video input terminal 37 of the recorder 11. The receiver subcarrier oscillator output 39 is connected by line 41 to input terminal 43 of the adapter network 15 and the output terminal 45 of the adapter network is connected via a line 47 to the receiver color demodulator input 49. The subcarrier oscillator output 51 of the recorder is connected via line 53 to terminal 55 of the adapter network, and the adapter network is operative to apply the subcarrier signal from terminal 45 of the adapter to the color demodulator input terminal 49 when a color TV program is being played back from the recorder 11.

Figure 2:
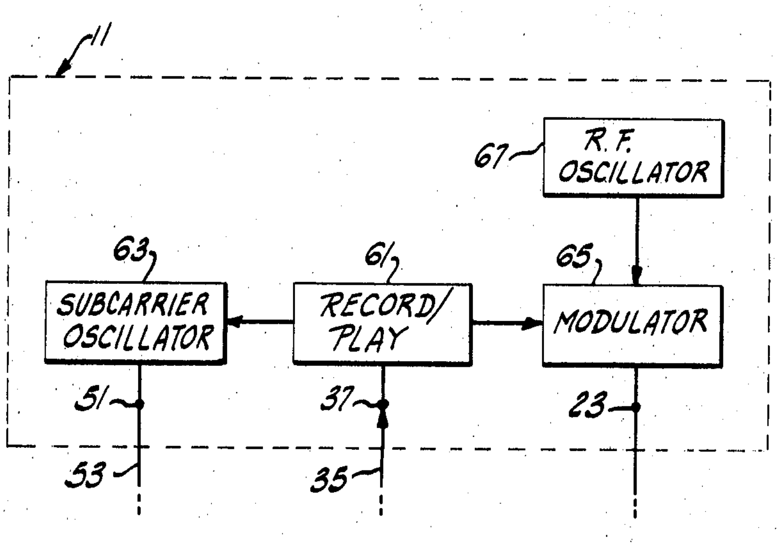
FIG. 2 is a functional block diagram of the video tape recorder of FIG. 1.

Referring next to FIG. 2 there is shown a typical video tape recorder 11 adapted to be used with the present invention. The composite video signal input at the terminal 37 is applied to the play/record unit 61. During playback a portion of the color burst signal from the composite video signal is applied to the subcarrier oscillator 63 from the play/record unit 61, which provides a continuous wave output signal to terminal 51 in synchronism with the color burst of the composite video signal. The unit 61 also provides a composite video signal output to the modulator 65 which combines with the signal from the RF oscillator 67 to provide a modulated RF output signal at the terminal 23, which signal will be at one of the predetermined channel frequencies of the color television receivers. There are a number of known techniques for recording the color burst signal component of the composite video signal. For example, during the record cycle, the color burst component may be separated from the composite video signal and applied to a phase-locked oscillator centered at the subcarrier frequency. The continuous wave output of the phase-locked oscillator is then divided by seven yielding approximately a 511 kc. which is multiplexed at a low level on the recorded video signal. Then during playback, the recorded 511 kc. signal is recovered from the composite video signal, multiplied by seven, amplified and fed to the subcarrier output terminal 51 and applied through the adapter 15 to the demodulator input 49 of the color television receiver 13.

Figure 3:
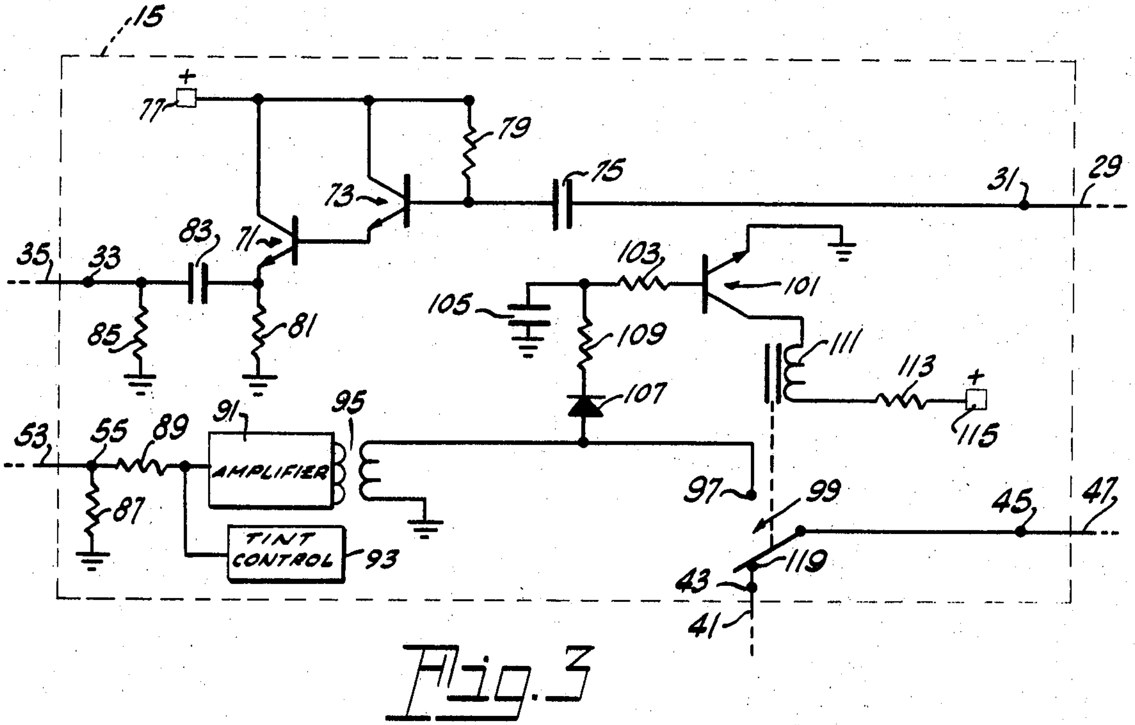
FIG. 3 is a schematic circuit diagram of one embodiment of an adapter according to the present invention.

One embodiment of an adapter network 15 shown schematically in FIG. 3 comprises a cascaded emitter follower network consisting of transistors 71 and 73 with the base electrode of transistor 73 connected via a capacitor 75 to input terminal 31 adapted to receive the detected composite video output from the television receiver 13. The collector electrodes of transistors 71 and 73 are connected to a source of energizing potential as represented by the terminal 77, which is also connected via a resistor 79 to the base electrode of the transistor 73. The emitter electrode of transistor 71 is connected via a resistor 81 to a point of reference potential, such as ground, and is also connected via a capacitor 83 to the output terminal 33. Terminal 33 is also connected to ground via a resistor 85. The input terminal 55 of the adapter network 15 is connected via a resistor 87 to ground and via a resistor 89 to the input of an amplifier 91. A tint control network 93 is also connected to the input of the amplifier 91. The output of the amplifier 91 is connected to the primary winding of a transformer 95, the secondary winding of which is connected between ground and one contact 97 of a two-position relay 99. A control transistor 101 has its emitter electrode connected to ground and its base electrode connected via a resistor 103 in series with a capacitor 105 to ground. The contact 97 of the relay 99 is connected via a diode 107 in series with a resistor 109 to the junction of the resistor 103 and the capacitor 105. The collector electrode of the control transistor 101 is connected via the control winding 111 of relay 99 in series with a resistor 113 to a source of energizing potential as represented by the terminal 115. The adapter network terminal 45 is connected directly to the armature contact of the relay 99, and the terminal 43 is connected directly to the second contact 119 of the relay 99.

Figure 4:
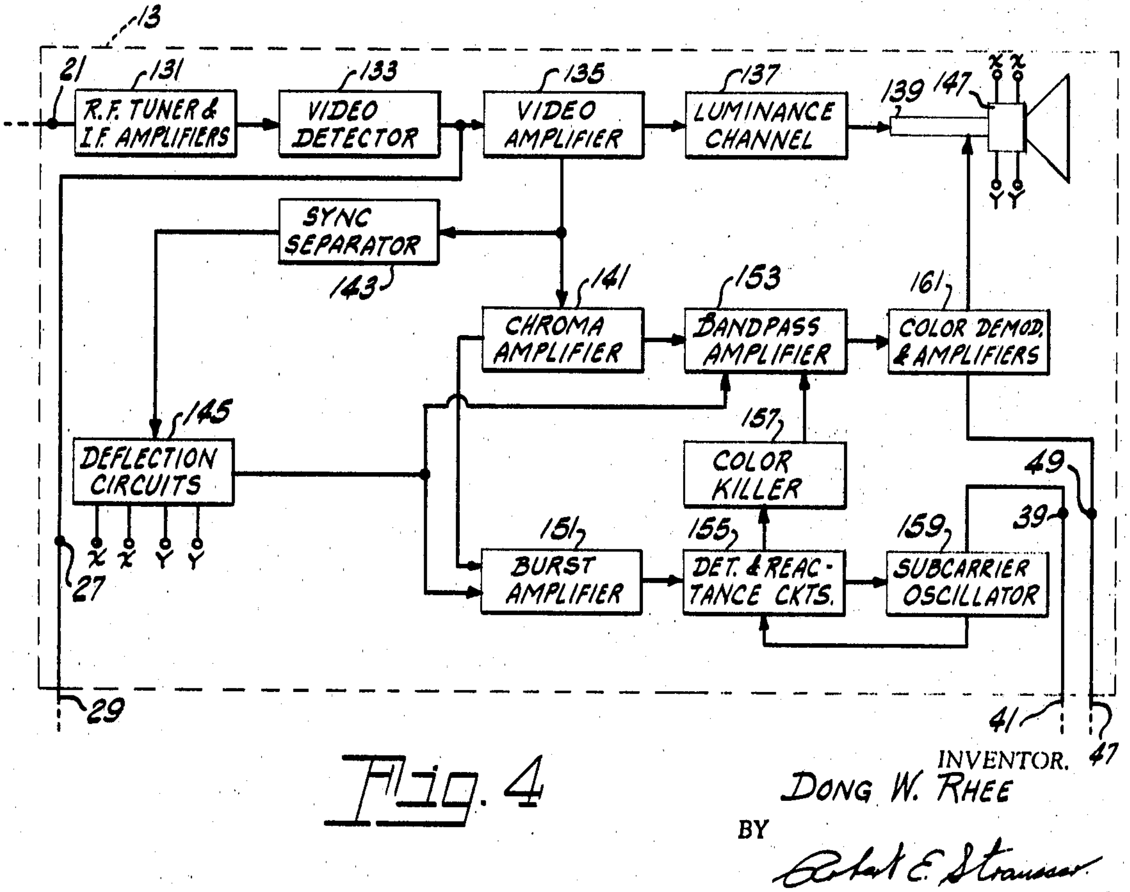
FIG. 4 is a block diagram of a television receiver modified for use in accordance with the present invention.

Referring next to FIG. 4, there is shown in block diagram form a typical color television receiver and the modifications made therein to adapt the receiver 13 for use in accordance with the present invention. Input terminal 21 is connected to the RF tuner and IF amplifier section 131, the output of which is applied to the video detector 133. The output of the video detector is applied to the video amplifier 135 and is also applied to the video detector output terminal 27 of the receiver. In the video amplifier the luminance signals are separated from the composite video signal and applied to the luminance channel 137, the output of which is applied to the cathode ray tube display device 139. The chroma output signals from the video amplifier are applied to a chroma amplifier 141 and the sync separator circuit 143. The output of the sync separator is applied to the deflection circuitry 145 which provides the deflection output signals at terminal X–X and Y–Y which are applied to the deflection yoke 147 mounted on the neck of the cathode ray tube 139. A second output from the deflection circuits 145 is applied in parallel to a burst amplifier 151 and to a band-pass amplifier 153, the latter also being adapted to receive the output signal from the chroma amplifier 141. The output of the burst amplifier 151 is applied to the detector and reactance circuit 155, one output of which is applied to the color killer circuitry 157 and the second output of which is applied to the local subcarrier oscillator 159. One output from the subcarrier oscillator is fed back to the detector and reactance circuits 155 and the second output from the reference oscillator is connected to terminal 39 of the receiver 13. The output from the color killer circuit is applied to the band-pass amplifier 153, and the output from the band-pass amplifier is applied to the color demodulators and amplifiers 161. The color demodulators and amplifiers also receive an input from receiver terminal 49. The outputs of the demodulators and amplifiers are applied to the cathode ray tube display device 139. The foregoing color television receiver differs from a conventional receiver only in that the subcarrier oscillator output is not connected directly to the input of the color demodulators and amplifiers 161, and conventional receivers do not normally provide a separate output from the video detector 133 to a terminal 27. In all other respects the receiver FIG. 4 is a conventional receiver and operates in a straightforward method which is sufficiently well known to forego the necessity for a detailed explanation.

The functioning of the system according to the present invention is best understood by considering separately the record and playback operations. Considering first the record operation with reference to FIGS. 1 through 4, during the record cycle the antenna 17 is connected via the switch 19 to the RF tuner input 21 of the receiver 13. The received signal is processed in normal fashion and a portion of the composite video signal output taken from the video detector 133 is applied to input terminal 31 of the adapter network 15. At the same time the adapter network relay 99 is not energized, so that terminal 45 of the adapter network is connected directly to the terminal 43 which connects the output of the receiver subcarrier oscillator 159 directly to the input of the color demodulators and amplifier circuits 161 thereby permitting normal operation of the television receiver so that the recorded signal can be monitored on the receiver. The cascaded emitter follower network connected between terminals 31 and 33 of the adapter network 15 provide impedance matching between the video detector output 27 of the receiver and the video input terminal 37 of the video tape recorder. Typically the video detector output impedance is quite high whereas the recorder input impedance may be low, for example, 75 ohms. During the record cycle the video output signal from the adapter 33 is applied to the input terminal 37 of the video tape recorder and the record unit 61 where the composite video signal is recorded in normal fashion. During the record cycle the control transistor 101 of the adapter network is biased to be nonconducting.

Considering next the playback function, the playback unit 61 applies the composite video signal to the modulator network 65 of the video tape recorder 11, and simultaneously the RF oscillator 67 provides an RF input to the modulator 65. The output at terminal 23 is the RF signal of a predetermined channel frequency modulated by the recorded composite video signal. During playback, the switch 19 is in the low position, as indicated by the dotted line, and the signal output from recorder terminal 23 is connected by means of the impedance matching network 25 to the RF tuner input 21 of the television receiver 13. The subcarrier burst signals from the record/play unit 61 activate the subcarrier oscillator 63 of the video tape recorder to thereby provide a continuous wave subcarrier signal output at terminal 51 which is in synchronism with the recorded color burst signals and closely tracks any speed variations which may occur in the video tape recorder. The subcarrier oscillator signal is applied to terminal 55 of the adapter network and through resistor 89 to the amplifier 91, which amplifies the signal to a predetermined level and the output of which is coupled from the primary to the secondary of the transformer 95. The diode 107 rectifies a portion of the oscillator signal to thereby activate the control transistor 101 causing emitter-to-collector current to flow therethrough, which activates the relay 99, connecting contact 97 of the relay directly to output terminal 45 of the adapter network. This, in turn, couples the synchronized subcarrier signal to the receiver input terminal 49 and the demodulator and amplifier circuits 61 to permit synchronized demodulation of the color signals which are processed through the chroma amplifier 141 and band-pass amplifier 153 of the receiver, so that the signals from the output of the demodulator and amplifier circuitry 161 provide an accurate reproduction of the recorded color signal. A tint control 93 is required in the adapter unit 15 since the control in the subcarrier oscillator 159 of the receiver 13 does not affect the phasing of the subcarrier signal emanating from the video tape recorder 11.

While the adapter 15 has been shown and described as a separate unit, it may be desirable to incorporate all or part of it into the video tape recorder 11. This might be the case, for example, where the video tape recorder is intended solely for use in a home entertainment system. Also, depending upon design preference the relay 99 and the control transistor 101 with its associated circuitry in the adapter may be replaced, for example, by an all electronic switch or by a manual switch.

It is then apparent that applicant has provided a novel and simplified color video tape recorder and television receiver system. With the present system faithful reproduction of color signals are readily attained from the recorder since the receiver is not dependent upon its local subcarrier oscillator, and speed variations in the recorder have no adverse effect upon the reproduced image. Utilizing the present invention, it is necessary to make relatively simple, inexpensive modifications in the television receiver thereby making it feasible to adapt all receivers for use in such a system without adversely affecting the cost of the receiver.

While there have been shown and described what are at present considered the preferred embodiments of the present invention, it will be obvious to those skilled in the art that various changes and modifications may be made therein without departing from the scope of the invention as defined by the appended claims.

I claim:

1. A record/play color video tape recorder and color television receiver system comprising:
- a color television receiver including an RF tuner, a video detector, demodulator circuitry and a reference oscillator;
- a color video tape recorder including a record/play unit, a subcarrier oscillator adapted to receive an input from said record/play unit, an RF oscillator and modulator circuitry adapted to receive inputs from said record/play unit and said RF oscillator;
- signal input means adapted to be connected to the RF tuner input of said color television receiver during the record operation;
- means connecting the modulator circuitry output of said video tape recorder to the RF tuner input of said color television receiver during the play operation;
- means connecting the video detector output of said color television receiver to the record/play unit input of said video tape recorder; and
- adapter means connected between said color television receiver and said video tape recorder, operative to apply the subcarrier oscillator output of said video tape recorder to an input of said demodulator circuitry in said color television receiver during the play cycle of operation, and additionally operative to connect the reference oscillator output to an input to the demodulator circuitry of said color television reciever during the record cycle of operation.

2. The invention according to claim 1 wherein said means connecting the video detector output of said color television receiver to the record/play unit input of said video tape recorder comprises:
- first and second transistor each having base, emitter and collector electrodes;
- means connecting said video detector output to the base electrode of said first transistor;
- means connecting the emitter electrode of said first transistor to the base electrode of said second transistor;
- a resistor connected between the emitter electrode of said second transistor and ground;
- means connecting the record/play unit input of said video tape recorder to the emitter electrode of said second transistor;
- a source of energizing potential connected to the collector electrodes of said first and second transistors; and
- a second resistor connected between the base electrode of said first transistor and said source of energizing potential.

3. The invention according to claim 1 wherein said adapter means comprises:
- first and second input terminals and an output terminal connected respectively to the subcarrier oscillator output of said video tape recorder, the reference oscillator output of said color television receiver and an input of the demodulator circuitry of said color television receiver;
- an amplifier;
- means connecting the input of said amplifier to said first input terminal; and
- control means coupling the output of said amplifier to said output terminal during the presence of a subcarrier signal and operative to connect said second input terminal to said output terminal during the absence of a subcarrier signal.

4. The invention according to claim 3 wherein said adapter means additionally comprises a tint control network connected to the input of said amplifier.

5. The invention according to claim 3 wherein said control means comprises:
- a relay having a control winding, first and second stationary contacts and a center armature contact, said first stationary contact connected to said second input terminal and said center armature connected to said output terminal, said center armature touching said first stationary contact when the relay is deenergized and touching said second stationary contact when said relay is energized;
- a transformer having its primary winding connected across the output of said amplifier and its secondary winding connected between ground and the second stationary contact of said relay;
- a transistor having base, emitter and collector electrodes, the emitter electrode thereof connected to ground;
- a source of energizing potential;
- a resistor connected in series with the control winding of said relay between the collector electrode of said transistor and said source of energizing potential; and
- biasing means connected between the base electrode of said transistor and the secondary winding of said transformer, operative in the presence of a subcarrier signal to forward bias said transistor causing emitter-to-collector current to flow through the control winding of said relay, thereby energizing said relay.

6. A record/play color video tape recorder and color television receiver system comprising:
- a color television receiver including an RF tuner, a video detector, demodulator circuitry, a subcarrier reference oscillator, first and second input terminals connected respectively to the inputs of said RF tuner and said demodulator circuitry, and first and second output terminals connected respectively to the outputs of said video detector and said subcarrier reference oscillator;
- a color video tape recorder including a record/play unit, a subcarrier oscillator adapted to receive an input from said record/play unit, an RF oscillator, modulator means adapted to receive inputs from said record/play unit and said RF oscillator, an input terminal connected to said record/play unit, and first and second output terminals connected respectively to the outputs of said subcarrier oscillator and said modulator means;
- a two-pole switching means connected to the first input terminal of said color television receiver;
- an antenna connected to one pole of said two-pole switching means;
- means connecting the other pole of said two-pole switching means to the second output terminal of said video tape recorder; and
- an adapter network including means connecting the first output of said color television receiver to the input of said video tape recorder and operative to provide impedance matching therebetween, means connecting the second output of said color television receiver to the second input of said color television receiver during the record cycle of operation and means connecting the first output terminal of said video tape recorder to the second input of said color television receiver during the play cycle of operation.